Oct. 27, 1931.  S. B. HASELTINE  1,829,138

FRICTION SHOCK ABSORBING MECHANISM

Filed March 15, 1929

Witness
Wm. Geiger

Inventor
Stacy B. Haseltine
By Joseph Harris
His Atty.

Patented Oct. 27, 1931

1,829,138

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed March 15, 1929. Serial No. 347,315.

This invention relates to improvements in friction shock absorbing mechanisms.

One object of the invention is to provide a friction shock absorbing mechanism especially adapted for railway draft riggings, including relatively movable end follower casings, a pair of side members having wedging engagement with the follower casings, friction wedge means at each end of the mechanism including a plurality of cooperating wedge friction members having cooperating wedge faces, certain of said members having wedging engagement with the side members, and spring resistance means interposed between the friction wedge means at opposite ends of the mechanism, wherein the mechanism is held assembled and of overall uniform length by top and bottom lugs at opposite ends of the side members, having shouldered engagement with the follower casings.

A further object of the invention is to provide a friction shock absorbing mechanism including front and rear follower casings having opposed interior wedge faces; a pair of side members having inner and outer wedge faces at each end thereof, the outer wedge faces of the side members engaging the wedge faces of the casings; a pair of friction wedge blocks at each end of the mechanism, having frictional engagement with the corresponding casing and wedging engagement with the wedge faces at the corresponding set of ends of the side members; a wedge block at each end of the mechanism, interposed between the front and rear wedge friction blocks and having wedging engagement therewith; and spring resistance means interposed between the wedge blocks at opposite ends of the mechanism, wherein the wedge blocks and casings have cooperating guide means thereon for maintaining the blocks in centered position while permitting longitudinal movement thereof, and the spring resistance is supported in position by ledges on the front and rear follower casings.

Other and further objects of the invention will more clearly appear from the description and claim hereinafter following.

Figure 1:
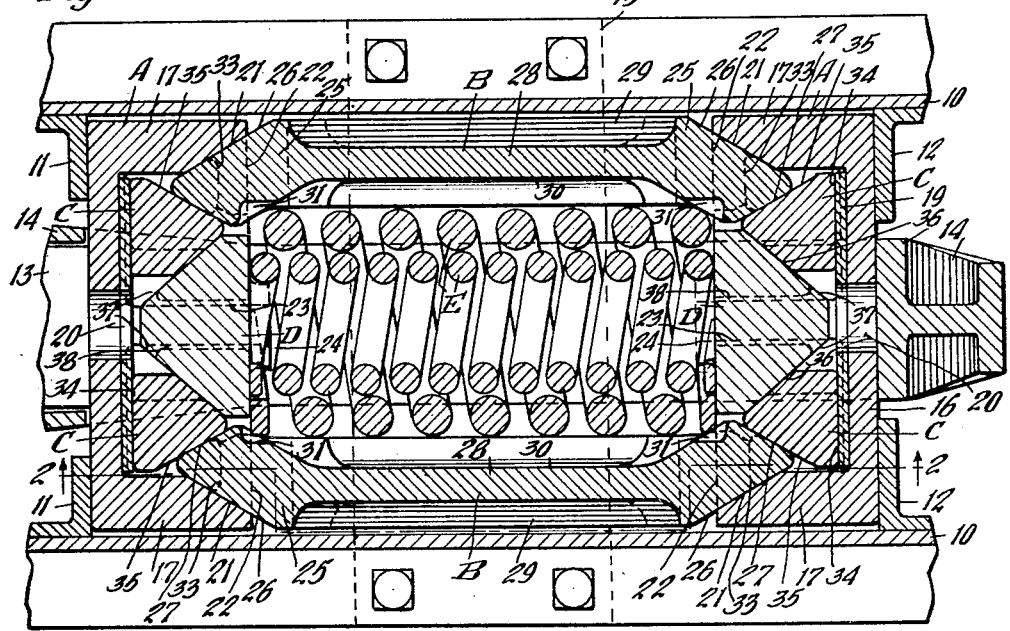
Figure 2:
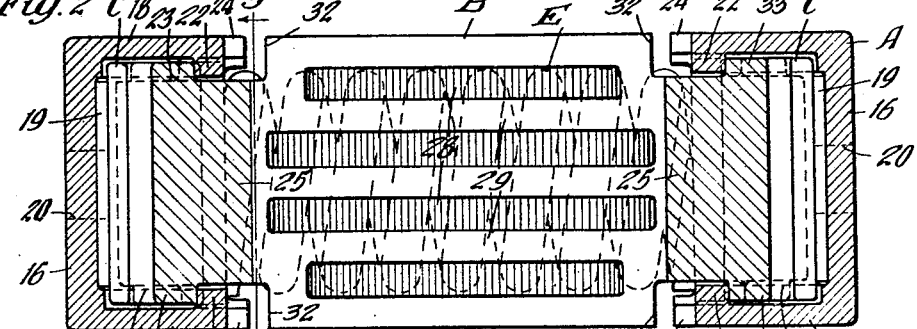
Figure 3:
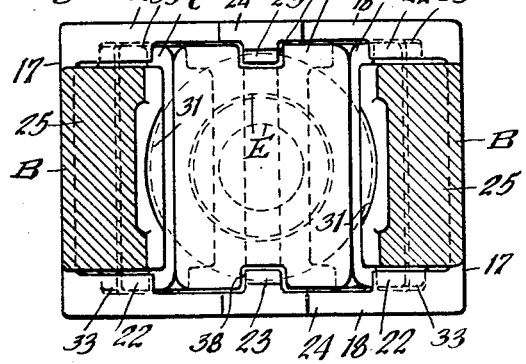

In the drawings forming a part of this specification, Figure 1 is a horizontal longitudinal sectional view through a portion of the underframe structure of a car at one end thereof, illustrating my improvements in connection therewith. Figure 2 is a part longitudinal vertical sectional view and part side elevational view, corresponding substantially to the line 2—2 of Figure 1. And Figure 3 is a transverse vertical sectional view, corresponding substantially to the line 3—3 of Figure 2.

In said drawings, 10—10 indicate channel-shaped center or draft sills of the railway car underframe, to the inner sides of which are secured the usual front stop lugs 11—11 and the rear stop lugs 12—12. The inner end of the coupler shank is designated by 13 and has operatively connected thereto a hooded yoke 14 of well known form. My improved shock absorbing mechanism proper is disposed within the yoke and the yoke in turn is supported by a detachable saddle plate 15 secured to the bottom flanges of the draft sills.

My improved shock absorbing mechanism proper comprises, broadly, front and rear follower casings A—A; side members B—B which also serve as retaining elements; two pairs of wedge friction blocks C—C; two central wedge blocks D—D; and a main spring resistance E.

The follower casings A are of similar design and have transversely disposed vertical end walls 16—16, longitudinally disposed, relatively short, spaced side walls 17—17, and horizontally disposed, spaced top and bottom walls 18—18. The end walls 16 are relatively heavy and cooperate with the corresponding stop lugs of the draft sills in the manner of the usual end followers. The inner surface of the end wall 16 of each casing is protected by a wear plate 19. The end wall and the corresponding wear plate of each casing are perforated centrally, as indicated at 20, for a purpose hereinafter pointed out. The side walls of each casing are provided with opposed interior wedge faces 21—21 at the inner ends thereof, which cooperate with the side members B—B; as hereinafter pointed out. Adjacent the wedge faces, the top and bottom walls 18—18 of each casing are provided with vertical transverse relatively short ribs 22—22 which cooperate with the members B to limit the outward movement of the casings. Each casing is also provided with top and bottom, centrally disposed, interior guide ribs 23—23 on the top and bottom walls thereof. Retaining and centering means for the spring resistance E is also provided on each casing, the same being in the form of top and bottom ledges 24—24 projecting inwardly from the top and bottom walls of the casings.

The side members B are of similar design, each being in the form of a column member disposed lengthwise of the mechanism. Each column member comprises solid end portions 25—25 having outwardly converging wedge faces 26 and 27 on the opposite sides thereof. Between the solid portions 25, each column B is formed by a vertically disposed, relatively heavy central web 28, reinforced exteriorly by longitudinally extending ribs 29—29. On the inner side, the face of each column is cut away, as indicated at 30, to provide a clearance for the corresponding side of the spring resistance E. As indicated at 31—31, the inner sides of the solid portions 25 of the columns are also cut away so as to provide clearance for the ends of the members forming the spring resistance E. Inwardly of the solid wedge portions 25, each column is vertically enlarged, thereby providing front and rear, top and bottom stop shoulders 32—32 which cooperate with the inner ends of the casings to limit relative approach thereof. The wedge faces 26 at the opposite ends of each column cooperate respectively with the interior wedge faces 21 of the front and rear follower casings at the same side of the mechanism. At the front and rear ends, each column member B has top and bottom relatively heavy lugs 33—33 which are adapted to engage with the ribs 22—22 of the front and rear casings, thereby limiting longitudinal separation of the casings and holding the parts of the mechanism assembled.

The friction wedge blocks C—C are four in number and are arranged in pairs at opposite ends of the mechanism. The blocks C are all of similar design, each having a flat front end face 34 having frictional engagement with the wear plate 19 of the corresponding casing A. At the inner end, each block is provided with inwardly converging wedge faces 35 and 36 on opposite sides thereof, the wedge face 35 engaging the corresponding wedge face 27 of one of the side members B.

The wedge blocks D, which are two in number, are also of similar design, each block having a flat inner end face directly engaging the corresponding end of the spring resistance E. At the outer end, each block is provided with a pair of outwardly converging wedge faces 37—37 which cooperate respectively with the wedge faces 36—36 of the pair of friction wedge blocks at the same end of the mechanism. Each wedge block D is longitudinally slotted at the top and bottom sides thereof, as indicated at 38—38, to receive the corresponding guide ribs 23—23 of the casing A. As will be evident, each block D is guided for longitudinal movement by the interengaging ribs and slots and is held against lateral displacement.

The main spring resistance E comprises inner and outer coils disposed lengthwise of the mechanism. The opposite ends of the outer coil are embraced respectively by the top and bottom ledges 24—24 of the front and rear follower casings, thereby centering the spring resistance means, supporting the same in proper position and preventing accidental removal thereof.

The parts are so proportioned that the side members B, which also serve as retaining elements in addition to holding the mechanism assembled, maintains the same of such an overall length that the spring resistance E is under initial compression in the full release position of the parts.

In assembling the mechanism, the side members are first attached to the casings A by disposing the side members inwardly of the ribs 22 and telescoping the casings over the ends of the same, thereby disposing the retaining lugs 33 of the side members beyond the ribs 22. The side members are then separated to bring the lugs 33 into overlapping and shouldered engagement with the ribs 22. The friction wedge blocks C—C are next placed in position within the casings A and the wedge blocks D inserted between each pair of blocks C. The main spring resistance is then compressed to an extent to pass between the ledges 24 of the front and rear follower casings and in such compressed condition is inserted between the front and rear wedge blocks D and then permitted to expand so as to engage the blocks and dispose the opposite ends of the spring resistance between the top and bottom ledges of the front and rear follower casings, respectively.

When it is desired to dismember the friction shock absorbing mechanism, the wedge blocks D are forced inwardly toward each other by rods or bars inserted through the perforations 20 of the front and rear follower casings. The blocks D are forced toward each other until the spring resistance E has been compressed to a sufficient extent that the same will pass between the inner edges of the ledges 24 of the front and rear follower casings, whereupon the spring may be forced out laterally from between the wedge blocks D. After the spring has been removed, the wedge blocks D may be withdrawn, whereupon the side members are pressed laterally inwardly to disengage the retaining lugs 33 from the ribs 22, thereby permitting separation of the follower casings A.

The operation of my improved shock absorbing mechanism, during a compression stroke, is as follows: The front and rear follower casings will be forced inwardly toward each other longitudinally of the mechanism, thereby wedging the side members B laterally inwardly toward each other. At the same time, the front and rear pairs of friction wedge blocks will be carried inwardly toward each other with the front and rear follower casings, and through the wedging engagement of the same with the said members B will be forced laterally inwardly toward each other. The wedge blocks D—D will thus be squeezed from between the wedge blocks C—C compressing the main spring resistance E. As will be evident, due to the lateral approach of the side members B during a compression stroke of the mechanism, a differential action will be had between the same and the friction wedge blocks C—C, thus causing a movement of the wedge blocks D toward each other in excess of the movement of the follower casings A and effecting a corresponding compression of the main spring resistance. Inward movement of the follower casings toward each other will be limited by the inner ends thereof engaging the shoulders 32 of the column members B, whereupon the actuating force will be transmitted through the column members directly, relieving the main spring resistance E from undue compression.

When the actuating force is reduced, in release of the mechanism, the expansive action of the main spring resistance E will force the wedge blocks D outwardly, separating the friction wedge blocks C and forcing the follower casings A outwardly also. Due to the interengaging wedging relation of the blocks D, C and the side members B, the latter will be spread apart, restoring the same to the normal full release position shown in the drawings. Outward movement of the follower casings will be positively limited by engagement of the lugs 33 at opposite ends of the column members with the stop ribs 22 of the casings. The length of the ribs 22 is such that the same will not be disengaged from the stop lugs during the operation of the mechanism when the same is compressed to the limit of its stroke.

From the preceding description, taken in connection with the drawings, it will be evident that I have provided simple and efficient retaining means for holding the parts of the mechanism assembled, as well as means for guiding the wedge blocks so as to prevent displacement of the same, and also simple and efficient means of centering and holding the spring assembled with the other parts of the gear.

While I have herein shown and described what I consider the preferred manner of carrying out my invention, the same is merely illustrative and I contemplate all changes and modifications which come within the scope of the claim appended hereto.

I claim:

In a friction shock absorbing mechanism, the combination with front and rear follower casings having opposed interior wedge faces at opposite sides thereof and top and bottom interior retaining ribs adjacent said wedge faces; column members at opposite sides of the mechanism, having top and bottom retaining lugs at opposite ends thereof, having shouldered engagement with the retaining ribs of the front and rear casings, each of the column members having wedging engagement with the wedge faces of said front and rear follower casings at the same side of the mechanism; a pair of friction wedge blocks at each end of the mechanism, having frictional engagement with the corresponding casing and wedging engagement with the column members; a central wedge at each end of the mechanism, having wedging engagement with the corresponding pair of friction wedge blocks; and a main spring resistance interposed between the central wedge blocks.

In witness that I claim the foregoing I have hereunto subscribed my name this 12th day of March, 1929.

STACY B. HASELTINE.